Figure 1:
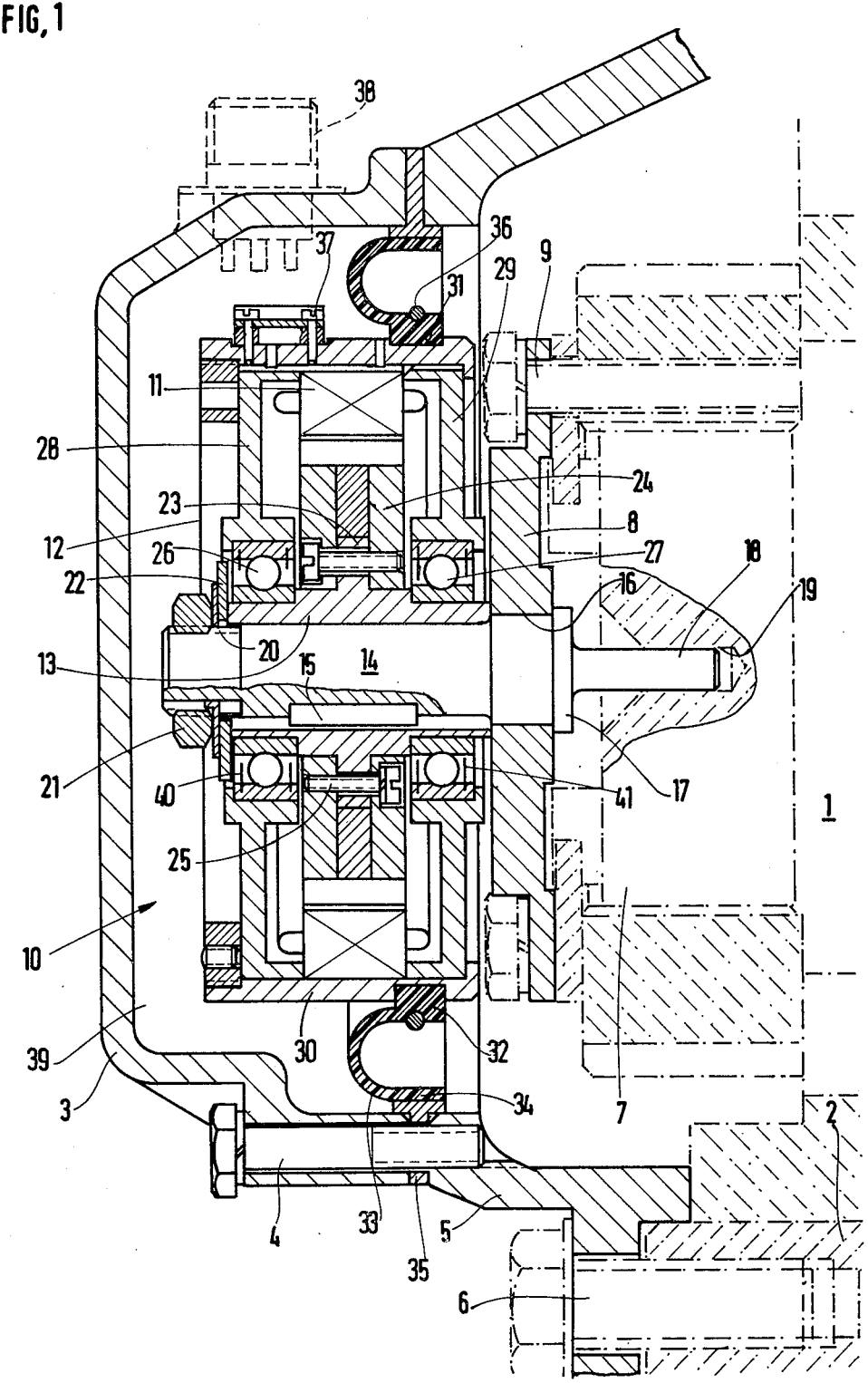

United States Patent [19]

Voelbel et al.

[11] 3,978,357

[45] Aug. 31, 1976

[54] TACHOMETER MOUNT FOR THE END OF A VEHICLE WHEEL AXLE

[75] Inventors: Heinz Voelbel; Erich Falke, both of Munich, Germany

[73] Assignee: Knorr-Bremse GmbH, Munich, Germany

[22] Filed: Mar. 6, 1975

[21] Appl. No.: 555,836

[30] Foreign Application Priority Data

Mar. 6, 1974 Germany............................ 2410692

[52] U.S. Cl. ................................ 310/168; 310/43; 310/91; 188/181 R
[51] Int. Cl.² ......................................... H02K 5/04
[58] Field of Search .............. 310/155, 168, 91, 43, 310/89, 90; 324/173, 174; 188/181 R, 181 A

[56] References Cited
UNITED STATES PATENTS

| | | | |
|---|---|---|---|
| 1,688,891 | 10/1928 | Spreen .............................. | 310/43 X |
| 3,487,247 | 12/1969 | Scheffler ............................ | 310/168 |
| 3,596,122 | 7/1971 | Stewart ............................ | 310/168 X |
| 3,652,886 | 3/1972 | Riordan et al. ..................... | 310/168 |
| 3,716,788 | 2/1973 | Nishida .............................. | 324/174 |
| 3,760,210 | 9/1973 | Abate ................................ | 310/168 |
| 3,772,542 | 11/1973 | Hallerback ......................... | 310/91 X |
| 3,772,549 | 11/1973 | Comming ........................... | 310/168 |
| 3,887,046 | 6/1975 | Bueler .............................. | 188/181 R |
| 3,910,386 | 10/1975 | Stigall et al. ....................... | 188/181 R |
| 3,928,802 | 12/1975 | Reinecke ............................ | 324/174 |
| 3,934,685 | 1/1976 | Jouick .............................. | 188/181 R |
| 3,939,373 | 2/1976 | Roberts .............................. | 310/168 |

*Primary Examiner*—Donovan F. Duggan
*Attorney, Agent, or Firm*—Edmund M. Jaskiewicz

[57] ABSTRACT

An electrodynamic tachometer has a rotor connected to the end of an axle and a stator. An annular element having substantially a C-shaped cross section connects the outer surface of the stator to a bearing housing enclosing the end of the axle. The annular member is of a flexible rubber material so as to be relatively stiff with respect to torsion but flexible with respect to axial and radial deflections.

10 Claims, 3 Drawing Figures

TACHOMETER MOUNT FOR THE END OF A VEHICLE WHEEL AXLE

The present invention relates to a mount for an electrodynamic tachometer the rotor of which is driven by the end of an axle, more particularly, to the mounting of the stator to the axle bearing housing by means of a resilient element.

It has been known to mount an electrodynamic tachometer of the type to which the present invention relates by means of a flexible rubber annular element to secure the stator housing of the tachometer firmly along a central portion thereof to the inner wall of the axle bearing housing. It was thus possible to mount the tachometer in advance firmly on the inner wall of the axle bearing housing. A coaxial pin was attached to the end of the axle and the free end of the pin then coupled to the rotor by means of a particular cross sectional configuration suitable for the transmission of torque. Essentially, the pin was provided with a noncircular cross section.

Such a mount provided the possibility of a relatively easy installation of the tachometer onto the end of the axle. In this connection relative movements between the rotor and stator were substantially avoided and fluctuations in the current generated as a function of the axle speed were virtually eliminated.

Such a mount was not completely satisfactory since difficulties were encountered because the rubber annular element between the axle bearing housing and the stator housing exerted a relatively strong resistance to radial displacement of the axle. It was necessary that the forces thus produced be absorbed by the driving pins and the bearings of the tachometer.

Axial movements of the vehicle wheel axle were transmitted to the driving pin for the rotor so that the coupling between the rotor and the driving pin which was constructed with a minimum of play was subjected to additional wear.

Difficulties were also encountered in precisely centering the tachometer mounted on the axle bearing housing with respect to the axle and the placement of the axle bearing housing while simultaneously coupling the rotor to the driving pin.

It is therefore the principal object of the present invention to provide a novel and improved mount for an electrodynamic tachometer coupled to the end of a vehicle wheel axle.

It is another object of the present invention to provide a mount for such a tachometer wherein installation of the mount is simplified and radial and axial deflections of the axle are absorbed to a maximum extent by the mount without adversely affecting the functioning of the tachometer.

It is a further object of the present invention to provide such a mount for a tachometer wherein relatively large radial and axial deflections of the axle can be absorbed by the mount without affecting the accuracy of the tachometer and wherein the tachometer is mounted so as to be free from soiling from dirt, lubricants and particles abraded during the functioning of the axle.

According to one aspect of the present invention a mount for an electrodynamic tachometer having a rotor connected to a vehicle wheel axle and a stator may comprise an annular element of flexible rubber material attached between the stator and the bearing housing. The annular element is of a material which is relatively stiff with respect to torsion but flexible with respect to axial and radial deflections.

Figure 2:
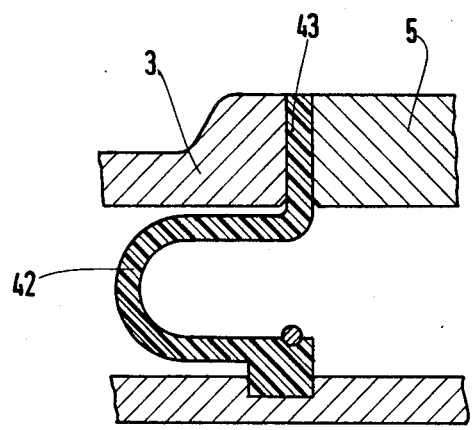
Figure 3:
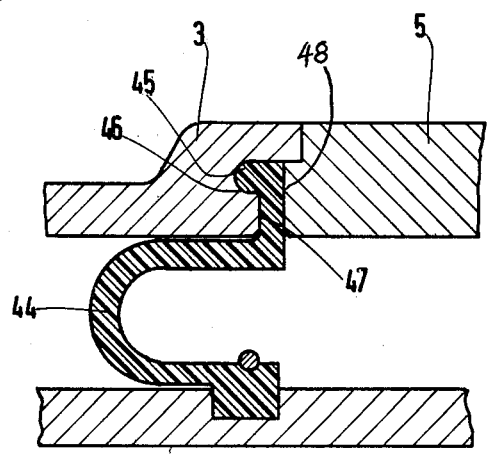

Other objects and advantages of the present invention will be apparent upon reference to the accompanying description when taken in conjunction with the following drawings, which are merely ememplary, wherein:

FIG. 1 is an axial sectional view through the tachometer mount according to the present invention; and FIGS. 2 and 3 are axial sectional views in enlarged scale through two modifications of fastening the annular element to the axle bearing housing.

Proceeding next to the drawings wherein like reference symbols indicate the same parts throughout the various views a specific embodiment and modifications of the present invention will be described in detail.

As may be seen in FIG. 1, an axle for a vehicle wheel is indicated at 1 and the end of this axle is enclosed by an axle bearing housing 2. The housing 2 further comprises a cover 3 which is secured thereon by means of bolts 4 received within an intermediate housing ring 5 which in turn is secured by bolts 6 to the axle bearing housing 2. The intermediate housing ring 5 is actually a portion of the axle bearing housing 2 that is covered by the cover plate 3.

The end of the axle 1 which is journaled by bearings as known in the art is indicated at 7 and on the end of this axle journal portion 7 is mounted a disk-shaped adapter 8 by means of bolts 9. The adapter 8 functions as a carrier or mounting element for an electrodynamic tachometer indicated generally at 10 which comprises a stator 12 in which is secured a magnetic coil 11 and a rotor 13 upon which the armature is mounted.

The rotor 13 essentially comprises a cylindrical sleeve which is securely mounted upon a shaft 14 by means of a key 15 so as to be capable of axial displacement but secured against rotation with respect to the shaft 14. One end of the shaft 14 extends through an opening 16 formed in the adapter 8 which opening is coaxial with wheel axle 1. The shaft 14 has a radially extending annular shoulder 17 that is disposed behind the edge of the opening 16 and bears against the face of the adapter plate 8 in the manner as shown in FIG. 1. The bolt 14 extends into a central pin 18 of a smaller diameter which is received within a coaxial centering bore 19 formed in the axle journal 7. The shaft 14 and the adapter 8 are securely interconnected by means of a force fit.

On the other end of the shaft 14 there is a threaded portion 22 upon which a nut 21 is threaded. Upon tightening of nut 21 washers 22 are pressed axially against the rotor whose other end is securely attached to the adapter 8. At the same time, the shaft 14 is firmly clamped to the adapter 8 by means of the annular shoulder 18 engaging the edge of the adapter opening 16. Thus, the rotor is clamped between the adapter 8 and the nut 21 by tightening of this nut.

At substantially its center portion, the rotor sleeve 13 is provided with a radially extending flange 23 upon which an armature 24 is mounted by means of screws 25. Ball bearings 26 and 27 are positioned on both sides of the armature 24 for the purpose of rotatably supporting the rotor in the fixed stator which comprises two annular end plates 28 and 29 mounted within a cylindrical housing 30. The ball bearings 26 and 27 are located between the inner edges of the annular end plates 28 and 29 and the peripheral surface of the rotor sleeve 13.

A continuous annular groove 31 is formed on the outer peripheral surface of the stator housing 30 and receives a reinforced enlarged portion 32 of an annular element or rolling diaphragm 33 which has a substantially C-shaped cross section as can be seen in FIG. 1. The annular element 33 has an outer edge portion 34 which is firmly attached to a disk 35 which in turn is clamped between the axle bearing housing cover 3 and the intermediate housing ring 5.

The annular element 33 is formed of a flexible elastomeric material, such as a synthetic rubber or a synthetic resin material having similar properties, which has the characteristic of being relatively stiff with respect to torsion but is flexible with respect to axial and radial movement. One example of such an annular element is the Bellofram Rolling Diaphragm manufactured by the Bellofram Corporation. Such an annular element comprises a fabric overlay structure with free circumferential elongation and yet allows no axial elongation.

A spring ring 36 is positioned in a grooved recess at the end of the reinforced enlarged inner section 32 of the annular element which is directed away from the groove 31. The ring 36 thus firmly presses the enlarged portion 32 into the stator groove 31 to provide a secure attachment between the annular element 33 and the stator.

The annular element 33 thus functions to mount the stator. Since the annular element 33 is relatively stiff with respect to torsion there will be no relative rotation between stator 12 and rotor 13 which is fixed on the axle journal 7 by means of the adapter 8. The elimination of such relative rotation will significantly increase the accuracy of the tachometer.

A cable connection 37 is located on the stator housing 30 and, correspondingly, a cable connection 38 is mounted on the axle bearing housing cover 3 through which electrical leads that are not illustrated may be led in to the housing.

The positioning of the cover plate 3 on the axle bearing housing defines a space 39 therein and this space is protected by the annular element 33 against foreign matter such as grease and lubricants, dirt, and any particles which may become abraded from the bearing. In order to protect further the air gap between the magnet coil 11 and armature 24 the ball bearings 26 and 27 are provided in a known manner with sealing disks 40 and 41.

It should be borne in mind that the present invention is not limited to the particular embodiment of the annular element 33 which has been described above and further modifications of such an annular element are shown in section in FIGS. 2 and 3.

In FIG. 2, there is provided a curved or bulging annular element 42 having a radial outer section 43 that is clamped between the cover 3 and intermediate housing ring 5.

In FIG. 3, an annular element 44 is provided on its outer peripheral edge with an enlarged or thickened portion 45 which is received within a recess 46 formed in a rearwardly projecting inner face 47 in the edge of the cover plate 3. This mounting of the outer edge of the annular element 44 prevents slipping of the annular element from its clamped connection between the cover plate 3 and the intermediate housing element 5. The front edge of the intermediate housing ring 5 is provided with an inner projecting face 48 so that the annular element 44 is firmly clamped between the face 48 and the inner face 47 of the cover plate 3.

It is readily apparent that the annular element according to the present invention which functions to secure the stator may have any other shape or configuration which is characterized by having little, if any, resistance to axial and radial displacement of the axial bearing but avoids any relative rotation between the rotor and the stator.

It should also be borne in mind that the annular element according to the present invention need not be clamped between the cover plate 3 and the intermediate housing 5 or the axle bearing housing 2 but may be attached at its outer periphery to an inner surface of the axle bearing housing 2.

Further, the mount disclosed herein is not considered to be limited to the electrodynamic tachometer illustrated and described herein. Further, the adapter may be of one piece with a bolt for fastening to the rotor and instead of a single bulging or curved annular element there may be provided two or more such elements positioned one after the other.

Thus it can be seen that the present invention has provided a reliable mount for an electrodynamic tachometer wherein the stator is mounted within the axle bearing housing in such a way so as to be incapable of rotative movement with respect to the rotor.

It will be understood that this invention is susceptible to modification in order to adapt it to different usages and conditions, and accordingly, it is desired to comprehend such modifications within this invention as may fall within the scope of appended claims.

What is claimed is:

1. A mount for an electrodynamic tachometer having a rotor connected to a vehicle axle and a stator and means for rotatably supporting said rotor within said stator, and comprising an annular element of flexible rubber material attached between the stator and a housing enclosing the end of the axle, said annular element material being relatively stiff with respect to torsion but flexible with respect to axial and radial deflections.

2. A mount as claimed in claim 1 wherein said annular element has a substantially C-shaped cross section.

3. A mount as claimed in claim 1 wherein the inner end of said annular element is attached to the peripheral surface of the stator.

4. A mount as claimed in claim 1 wherein the outer edge of said annular element is clamped between the housing and a cover for said housing.

5. A mount as claimed in claim 1 and an adapter on the end of the vehicle axle, said rotor having a shaft one end of which is connected to said adapter and the other end of which is threaded, said shaft one end extending through said adapter and received within a centering bore in said axle, and a nut threaded on said shaft other end to clamp said rotor between said adapter and said nut.

6. A mount as claimed in claim 1 and a armature ring fixedly mounted on said rotor, said supporting means comprising said stator having a pair of end plates on opposite sides of said armature ring, and ball bearing means between said rotor and said stator end plates on both sides of said armature ring.

7. A mount as claimed in claim 6 wherein said stator has a cylindrical housing with an annular groove in the outer face thereof, the inner end of said annular element comprising an enlarged portion received within said annular groove, and a spring ring around said enlarged portion to press said enlarged portion into said groove.

8. A mount as claimed in claim 6 and sealing disks on said ball bearing means to seal the air gap between the stator and the rotor.

9. In an electrodynamic tachometer mount, the combination of a rotor connected to an end of an axle the rotary speed of which to be measured, a stator, means for rotatably supporting said rotor within said stator, a bearing housing enclosing the end of the axle and said stator, an annular element of flexible rubber material attached between said stator and said housing, said annular element material being relatively stiff with respect to torsion but flexible with respect to axial and radial deflections.

10. A mount as claimed in claim 1 wherein said annular element comprises a rolling diaphragm.

* * * * *